March 22, 1949. W. K. A. BÖHME 2,465,055
MECHANICAL JOINT FOR TWO COMPONENTS
Filed April 18, 1946

INVENTOR
WALTER KARL AUGUST BÖHME
BY
ATTORNEY

Patented Mar. 22, 1949

2,465,055

UNITED STATES PATENT OFFICE 2,465,055

MECHANICAL JOINT FOR TWO COMPONENTS

Walter Karl August Böhme, Eindhoven, Netherlands, assignor, by mesne assignments, to Hartford National Bank and Trust Company, Hartford, Conn., as trustee Application April 18, 1946, Serial No. 663,112
In the Netherlands December 17, 1941

Section 1, Public Law 690, August 8, 1946
Patent expires December 17, 1961

3 Claims. (Cl. 189—36)

This invention relates to a mechanical joint of two members one of which is plate-shaped, said joint being established on the edge of the plate-shaped member.

The invention has for its object to provide a mechanical joint for two components one of which is plate shape and in corresponding cases which joint can be carried out in a most simple manner and with the use of normal attachment material, takes up little room and is cheap and light.

According to the invention, for this purpose the joint is formed by a cleavable and preferably hollow part which is passed through a fitting aperture of the plate to be secured and is set tightly by pressure or impact in cuts which are formed in a diverging manner into the part to which the plate is secured.

According to this manner of attachment the cuts may readily be formed on the one, if desired solely accessible side of the part referred to and by suitable choice of the thickness of the parts concerned of the cleavable member and of the width of the slits in the part a most reliable joint may be obtained, since the part splitted off can be torn off with much greater difficulty when forced in bent-out position into a slit of given length than when bent-out in the open space in the usual manner, for example with a split-pin, after being passed through a hole.

The joint according to the invention may be used with particular advantage with plates arranged transversely to each other by forming an aperture in the superposed plate and forming the cuts arranged in a diverging manner in the edge of the other plate, the outward spacing between the cuts at the edge of the plate concerned corresponding with the width of the aperture referred to and the uniting member being constituted by a flanged tubular element which fits into the aperture and is pressed or beaten into the cuts in such manner that the tubular part of the tubular element is split up into four parts two of which fill the cuts, whereas the other two become located on either side of the plate in which the cuts are formed.

According to this method of attachment displacement of the superposed plate in the direction of the edge of the plate in which the cuts are formed is avoided by the parts of the flanged tubular element in the cuts and a transverse displacement is avoided by the two parts of the flanged tubular element which are left on either side of the plate comprising the cuts and which engage the two surfaces of the latter throughout their lengths. The attachment as obtained according to the invention is particularly secure and lasting, whilst replacement after dismounting does not entail any difficulty at all.

It is particularly advantageous in the latter case to make the inward spacing of the cuts at the edge of the plate concerned approximately equal to the thickness of the latter and to use a cylindrical flanged element whose internal diameter is equal to the diagonal of the approximately square portion formed on the edge of the plate by the cuts, whereas the diameter of the hole in the superposed plate is equal to the external diameter of the flanged tubular element.

In the manner referred to above, a flanged tubular element is divided into four approximately equal parts. This ensures a favourable action both of the two strips which are rigidly clamped in the cuts and of those which constitute the extensions of considerable stiffness which safeguard the plate against transverse displacement.

The experiments on which the invention is based revealed that it is preferable that for the diverging cuts an angle of from 45 to 60° relatively to the edge of the plate should be chosen to ensure both easy provision of the connecting parts and secure attachment of the latter.

In those cases in which reference has been made in the foregoing to dimensions that have to correspond with those of the flanged tubular element used it may be desirable to provide small relative divergences in these dimensions so that distortion of the material of the flanged tubular element and a more secured clamping action are obtained. These forms of construction should also be looked upon as falling within the scope of the present invention.

In order that the invention may be more clearly understood and readily carried into effect it will now be set out more fully with reference to the accompanying drawing, in which Figure 1 is a side view of a plate having the diverging cuts therein according to the invention.

Figure 1:
Figure 2:
Figure 2 is a plan view of the top edge of the plate shown in Figure 1.

Referring to Figs. 1 and 2, cuts 1 are so formed in the edge of the plate 2 that a square part 3 of the material section is left between the cuts, the latter being formed so as to be at an angle of 60° with the edge of the plate.

Figure 3:
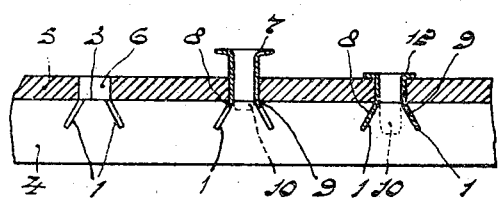
Figure 3 is a side view of a plate similar to that drawn in Figure 1 with another plate shown in cross-section attached thereto as by the joint of the present invention and with the various phases of the flanged tubular element insertion depicted.
Figure 4:
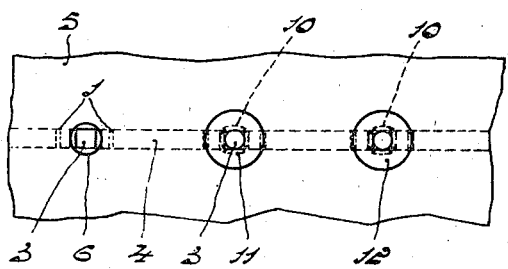
Figure 4 is a top plan view of the two plates shown in Figure 3.

Figs. 3 and 4 show a strip 4 comprising three sets of cuts 1 and a sectional view of a plate 5 which is superposed on the strip 4 and has formed in it round holes 6 whose diameter corresponds to the outward spacing of the slits at the edge of the strip 4. A flanged tubular element 7 is placed in the hole 6 and already pressed into the strip 4. It is seen that the flanged tubular element starts to split and at 8, 9 starts to slip in the cuts 1, whilst at the same time the parts 10 and 11 slide along normally to the plate 5 and parallel to the plane of the strip 4. This movement is carried out to the end with the flanged tubular element 12 and it is thus seen that the parts 8 and 9 have been firmly seated in the slits 1, whereas the strips 10 and 11 have become located on either side of the strip 4 and avoid any transverse displacement in the slits 1.

The method described ensures a most simple and reliable joint between the parts 4 and 5 with the avoidance of the disadvantages generally involved by the known methods of attachment. Outside the profile of 4 the joint hardly takes up any room and is thus very satisfactory even from an aesthetical point of view. It may be employed for the most different uses, for example for mechanical joints in wireless sets, instruments, household articles and toys.

Figure 5:
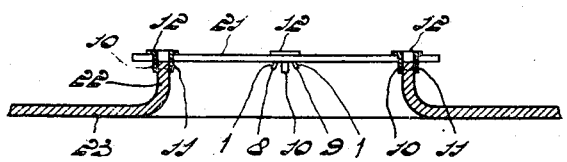
Figure 5 shows an example of the use of the joint according to the present invention.

Fig. 5 shows how a transparent covering plate 21, for example of Celluloid, may be attached in a most simple and efficient manner to the inside of the edge 22 of a front plate 23 pressed from metal sheet, for example for a wireless set or a measuring instrument. The manner of attachment entirely corresponds with that of the preceding figures so that it suffices to use similar numerals to those employed in the other figures for the flanged tubular elements, cuts, and so forth, used. It is seen that the attachment is almost invisible from without and does not practically reduce the scale room. This ensures the advantage of very simple and low cost mounting.

A favourable use of the construction according to the invention is the attachment of a flat flange to a hollow cylinder, for example as the final plate of a coil body. A simple but light and strong coil is obtained in this manner.

What I claim is:

1. A mechanical joint for two components comprising a first plate-shaped element having a pair of diverging slots in an edge thereof, the divergence being in the direction away from said edge, a second plate-shaped element arranged transversely of said first plate-shaped element, an aperture in said second plate-shaped element having a diameter corresponding to the spacing between the outer sides of said diverging slots at said edge, and a joint member comprising a tubular element having an outward projection at one end thereof and fitting into said aperture at the other end thereof and so pressed into said diverging slots that the tubular portion of said tubular element is split up into four parts two of which enter the diverging slots while the other two parts are located on either side of said first plate-shaped element.

2. A mechanical joint for two components as claimed in claim 1 wherein the spacing between the inner sides of said diverging slots at said edge is substantially equal to the thickness of said first plate-shaped element and to the internal diameter of said flanged tubular element and the diameter of said aperture in said second plate-shaped element is substantially equal to the external diameter of said tubular element.

3. A mechanical joint for two components as claimed in claim 1 wherein the angle which said diverging slots form with the edge of said first plate-shaped element is from 45° to 60°.

WALTER KARL AUGUST BÖHME.

REFERENCES CITED

The following references are of record in the file of this patent:

UNITED STATES PATENTS

| Number | Name | Date |
|---|---|---|
| 638,564 | Davies | Dec. 5, 1899 |
| 1,004,183 | Murphy | Sept. 26, 1911 |
| 1,575,465 | Thompson | Mar. 2, 1926 |
| 2,002,466 | Belden | May 21, 1935 |

FOREIGN PATENTS

| Number | Country | Date |
|---|---|---|
| 323,763 | Germany | Aug. 5, 1920 |